Patented Mar. 12, 1929.

1,705,264

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

METHOD OF OBTAINING COLORED POLYMERIZED STYROL AND ITS HOMOLOGUES AND PRODUCTS OBTAINED THEREBY.

No Drawing. Original application filed January 29, 1925, Serial No. 5,457. Divided and this application filed March 31, 1927. Serial No. 180,059.

This invention relates to methods of obtaining colored polymerized styrol and its homologues and to the products obtained thereby.

Polymerized styrol may be colored by adding pigments thereto. Such a method of coloring is limited to the formation of opaque colored masses. According to the present invention processes have been developed for preparing colored polymerized styrol which may retain its transparent properties, at the same time possessing fluorescence. By the present process it is possible to obtain an extremely wide variety of shades and tones far beyond the few colors which can be obtained with the usual pigments.

With a preferred embodiment in mind and without intention to limit the invention beyond what is required by the prior art, the invention briefly consists in combining with unpolymerized styrols coloring matter which is soluble in unpolymerized styrols and at least colloidally soluble in the polymerized styrols. It also consists in forming polymerized styrols from solutions of such coloring matter in liquid styrol. The invention also relates to methods of obtaining colors with inorganic salts, which may or may not impart fluorescence.

This application is a division of Serial No. 5,457 filed January 29, 1925. The present application is concerned with the materials which are for the most part inorganic, and which may be regarded as giving colloidal solutions in styrol glass. The colored products, while still transparent as compared with styrol glass colored with ordinary pigments, have the transparency which is characteristic of colloidal solutions. They may be faintly milky but nevertheless substantially transparent. It is obvious that as the amount of coloring matter is increased, the glass may vary through the entire range from almost water white, through transparency, translucency into opaqueness, but for the most part styrol glass when colored with materials which are colloidally soluble therein will be of varying degrees of translucency. The expression "styrol glass" as used herein signifies polymerized styrol, and styrol without qualification signifies unpolymerized styrol and its homologues.

It has been discovered that a number of inorganic materials are soluble in liquid styrol, that is unpolymerized styrol, and that many of these materials are likewise at least colloidally soluble in styrol glass.

It has further been discovered that a number of the coloring materials which are soluble both in styrol and in styrol glass retain their color unchanged or but slightly altered by the polymerization step which is carried out at 140°–175° C. to form vitreous styrol glass, or higher to form brittle glass.

This method of coloring styrol glass makes it possible to obtain remarkable results in purity of tint, even distribution of the coloring material, as well as in the optical and other physical properties of the glass.

Certain inorganic salts are soluble in styrol and in styrol glass. Some of these also impart colors to the glass. Solutions of colloidal metals, particularly gold, silver, and mercury can be obtained in styrol glass. Anhydrous gold chloride, silver nitrate, or hydrohalide salts of mercury can be dissolved in styrol. When these solutions are heated to 140°–180° C. in the course of the polymerization of the styrols, colloidal solutions of the metals are found simultantously. It would appear that the reduction of the original salts has been accomplished by the styrol itself or by the aldehyde formed during the polymerization. It is advisable to have a small amount of styrol glass dissolved in the styrol, to function as a protective colloid.

A small amount of gold chloride which has been dried in vacuo at 80° C. is introduced into styrol containing about 3–5% of styrol glass. The resulting mixture is well shaken up and carefully heated, the temperature being raised quite gradually to the boiling point. The resulting, fairly opaque solution is quickly filtered off through a folded paper filter while still hot and then is immediately introduced in small portions into styrol containing about 5% of styrol glass until a blue coloring somewhat deeper than the desired shade is obtained. The mixture is thoroughly shaken up and if necessary is again filtered off. It is then polymerized for 25 hours at 140° C. and again 5 hours at 180° C., in the last instance without a reflux condenser. The product is styrol glass colored with colloidal gold. In transmitted light it displays a pure light blue or deeper blue tint, and in reflected light, a soft reddish brown.

If a strong solution of gold chloride, as has already been described, is introduced into styrol containing more than 10% of styrol glass, the colloidal gold during the polymerization step does not have time to become evenly distributed throughout the glass, and the product is colorless in some places and cloudy in others.

The color that styrol glass takes on under the action of silver nitrate depends upon the following conditions: (1) concentration of the silver nitrate used (2) duration and temperature of the polymerization (3) purity of the silver nitrate.

Pure silver nitrate usually colors styrol glass to various shades of brown, or to a very dark, almost black color. When containing salt to the amount of 0.001%, glass is produced which even in a thick sheet (about 10 cm.) has a scarcely noticeable brown tint. In the presence of 0.01% of silver nitrate the resulting glass is almost opaque when in a thick sheet, but in transmitted light it shows brown whilst in reflected light it is likewise opaque, opalescing with a dark brown, almost black color with a curious greenish reflection.

Impure silver nitrate which tarnishes when exposed to daylight or in a moist atmosphere, produces more interesting and varied colorings. For this purpose silver nitrate was used which had been recovered from the silver chloride obtained from the fixing solutions used in photography. Glass which contains 0.001% of such silver salts (polymerization is kept up for 15 hours at 140° C.) acquires a pure golden-yellow color and does not opalesce. When the content of silver nitrate approximates 0.013% the glass takes on a lovely dark red color, but in reflected light it shows opaque and whitish-gray of a most curious shade. In a thin sheet it displays a peculiar green fluorescence. Analogous results were obtained with 0.04% of silver nitrate; when the content is reduced to 0.008% an interesting reddish-brown color, without any fluorescence is obtained.

To 20 gms. of styrol containing 1–3% of styrol glass, 5 ccm. of a solution of 0.02 gms. of silver nitrate in 50 ccm. of styrol which likewise contains 1–3% of styrol glass, are added, the temperature being raised gradually. This mixture is heated with a reflux (air) condenser for 12 hours at 175° C. In the end styrol glass containing 0.008% of silver nitrate is obtained. For coloring glass of this kind see above.

Silver nitrate also possesses the property, even when present in amounts as small as 0.001%, of rendering the styrol glass more durable, pliable and resilient.

The process is also applicable to the light colored resins and resinous products, known as condensation products provided the coloring materials are soluble in these products and are unaffected by the temperatures reached in forming the resins. The process may also be used in coloring the rough transparent vitreous (alpha) polymerized styrols, the beta or brittle modification of polymerized styrol, as well as to other modifications and to mixtures of the several modifications of styrol glass.

Having thus described my invention, what I claim and desire to protect by Letters Patent is:

1. A process for producing colored polymerized styrols which comprises forming in styrol colloidal solutions of inorganic coloring material, polymerizing the styrol therein to a solid state, and recovering a polymerized styrol containing said inorganic material in colloidal solution.

2. A process for producing colored polymerized styrols which comprises forming a solution of an inorganic coloring compound in styrol, heating said solution to polymerize the styrol into solid form, and recovering a polymerized styrol containing said inorganic material in colloidal solution therein.

3. A process for producing colored polymerized styrols which comprises dissolving an inorganic pigmentary salt in unpolymerized styrol, heating to polymerize the styrol into a solid form, and recovering a colored polymerized styrol in which the metallic radical of said salt is in colloidal solution.

4. A process for producing colored polymerized styrols which comprises dissolving an inorganic pigmentary salt in unpolymerized styrol in the presence of a small amount of a polymerized styrol as a protective colloid, polymerizing the solution to solid form, and recovering a colored polymerized product in which the metallic radical of said inorganic salt is in colloidal solution.

5. A method of coloring polymerized styrol with heavy metals in colloidal condition which comprises forming a styrol solution of a salt of said metal, heating the solution to polymerize the styrol therein to a solid state, and recovering a colored polymerized styrol containing said metal in colloidal solution.

6. A method of coloring polymerized styrol with metals in colloidal condition which comprises forming a styrol solution of a heavy metal salt, heating at 140°–180° C. to polymerize the styrol, and recovering a colored polymerized product containing the metallic radical of said salt in colloidal solution.

7. A method of coloring polymerized styrol with metals in colloidal condition which comprises forming a solution of a heavy metal salt in unpolymerized styrol containing a small amount of polymerized styrol as a protective colloid, heating at 140°–180° C. to polymerize the styrol, and recovering a colored polymerized product containing the metallic radical of said salt in colloidal solution.

8. A method of coloring polymerized styrol with metals in colloidal condition which comprises dissolving a silver salt in unpolymerized styrol, heating the solution to polymerize the styrol to a solid form and recovering a polymerized product colored with said silver in colloidal solution in the mass.

9. A method of coloring polymerized styrol with metals in colloidal condition which comprises forming a solution of a silver salt in unpolymerized styrol containing a small amount of polymerized styrol as a protective colloid, heating at 140°–180° C. to polymerize the styrol, and recovering a colored polymerized product containing the metallic radical of said salt in colloidal solution.

10. A method of coloring polymerized styrol with metals in colloidal condition which comprises dissolving a silver nitrate in unpolymerized styrol, heating the solution to polymerize the styrol to a solid form and recovering a polymerized product colored with said silver in colloidal solution in the mass.

11. A method of coloring polymerized styrol with metals in colloidal condition which comprises forming a solution of a silver nitrate in unpolymerized styrol containing a small amount of polymerized styrol as a protective colloid, heating at 140°–180° C. to polymerize the styrol, and recovering a colored polymerized product containing the metallic radical of said salt in colloidal solution.

12. As new products, polymerized styrols colored with heavy inorganic elements in colloidal solution.

13. As new products, polymerized styrols colored with heavy metals in colloidal solution therein.

14. As a new product, polymerized styrol colored with silver in colloidal solution therein.

Signed at New York, county of New York State of New York, this 29th day of March, 1927.

IWAN OSTROMISLENSKY.